(12) United States Patent
Corre et al.

(10) Patent No.: US 11,192,089 B2
(45) Date of Patent: Dec. 7, 2021

(54) PROCESS FOR HYDROCONVERSION OF HEAVY HYDROCARBON FEEDSTOCK IN HYBRID REACTOR

(71) Applicant: IFP Energies Nouvelles, Rueil-Malmaison (FR)

(72) Inventors: Thibaut Corre, Thurins (FR); Thanh Son Nguyen, Villeurbanne (FR); Joao Marques, Chasse sur Rhone (FR); Audrey Bonduelle-Skrzypczak, Francheville (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/772,249

(22) PCT Filed: Nov. 29, 2018

(86) PCT No.: PCT/EP2018/083061
§ 371 (c)(1),
(2) Date: Jun. 12, 2020

(87) PCT Pub. No.: WO2019/115248
PCT Pub. Date: Jun. 20, 2019

(65) Prior Publication Data
US 2021/0101136 A1    Apr. 8, 2021

(30) Foreign Application Priority Data
Dec. 13, 2017 (FR) ...................................... 1762061

(51) Int. Cl.
| | |
|---|---|
| *B01J 23/00* | (2006.01) |
| *B01J 21/04* | (2006.01) |
| *B01J 23/883* | (2006.01) |
| *B01J 27/051* | (2006.01) |
| *B01J 27/19* | (2006.01) |
| *B01J 35/00* | (2006.01) |
| *B01J 37/04* | (2006.01) |
| *B01J 37/08* | (2006.01) |
| *B01J 37/20* | (2006.01) |
| *C10G 45/08* | (2006.01) |

(52) U.S. Cl.
CPC ............. *B01J 23/002* (2013.01); *B01J 21/04* (2013.01); *B01J 23/883* (2013.01); *B01J 27/0515* (2013.01); *B01J 27/19* (2013.01); *B01J 35/0013* (2013.01); *B01J 37/04* (2013.01); *B01J 37/088* (2013.01); *B01J 37/20* (2013.01); *C10G 45/08* (2013.01); *C10G 2300/107* (2013.01); *C10G 2300/1077* (2013.01); *C10G 2300/202* (2013.01); *C10G 2300/205* (2013.01); *C10G 2300/206* (2013.01); *C10G 2300/208* (2013.01); *C10G 2300/301* (2013.01); *C10G 2300/4006* (2013.01); *C10G 2300/4012* (2013.01); *C10G 2300/4018* (2013.01); *C10G 2300/70* (2013.01)

(58) Field of Classification Search
CPC ........ B01J 21/04; B01J 23/002; B01J 23/883; B01J 23/94; B01J 27/049; B01J 27/0515; B01J 27/19; B01J 35/0013; B01J 35/1014; B01J 35/1019; B01J 37/0201; B01J 37/0209; B01J 37/04; B01J 37/088; B01J 37/20; B01J 2523/00; C10G 45/08; C10G 2300/107; C10G 2300/1077; C10G 2300/202; C10G 2300/205; C10G 2300/206; C10G 2300/208; C10G 2300/301; C10G 2300/4006; C10G 2300/4012; C10G 2300/4018; C10G 2300/70

See application file for complete search history.

(56) References Cited

U.S. PATENT DOCUMENTS

| | | | |
|---|---|---|---|
| 5,320,741 A | 6/1994 | Johnson et al. | |
| 2009/0107883 A1* | 4/2009 | Maesen | B01J 37/20 |
| | | | 208/111.15 |
| 2013/0008829 A1* | 1/2013 | Marchand | B01J 27/14 |
| | | | 208/177 |
| 2018/0355262 A1 | 12/2018 | Dreillard et al. | |

FOREIGN PATENT DOCUMENTS

| | | |
|---|---|---|
| EP | 0565205 A1 | 10/1993 |
| FR | 3045650 A1 | 6/2017 |

OTHER PUBLICATIONS

Adolfo Romero-Galarza et al: "Analysis of the promotion of CoMoP/AlOHDS catalysts prepared from a reduced HPMo heteropolyacid Co salt", Journal of Catalysis, Academic Press, Duluth, MN, US, vol. 280, No. 2, Mar. 23, 2011 (Mar. 23, 2011), pp. 230-238, XP028216795, ISSN: 0021-9517, DOI: 10.1016/J.
Jocelyn North et al: "Efficient hydrodesulfurization catalysts based on Keggin polyoxometalates", Applied Catalysis A: General, vol. 508, Oct. 14, 2015 (Oct. 14, 2015), Amsterdam, NL, pp. 16-24, XP055500657, ISSN: 0926-860X.
International Search Report in PCT/EP2018/083061 dated Feb. 19, 2019 (pp. 1-15).

* cited by examiner

*Primary Examiner* — Brian A McCaig
(74) *Attorney, Agent, or Firm* — Millen White Zelano and Branigan, PC; John Sopp

(57) ABSTRACT

The present invention relates to a process for hydroconversion of a heavy hydrocarbon feedstock in the presence of hydrogen, at least one supported solid catalyst and at least one dispersed solid catalyst obtained from at least one salt of a heteropolyanion combining molybdenum and at least one metal selected from cobalt and nickel in a Strandberg, Keggin, lacunary Keggin or substituted lacunary Keggin structure.

26 Claims, No Drawings

PROCESS FOR HYDROCONVERSION OF HEAVY HYDROCARBON FEEDSTOCK IN HYBRID REACTOR

TECHNICAL FIELD

The present description relates to a process for hydroconversion of a heavy hydrocarbon feedstock in the presence of hydrogen, a supported solid catalyst and a solid catalyst dispersed and entrained by the heavy hydrocarbon feedstock.

PRIOR ART

The hybrid process used for the hydroconversion of heavy hydrocarbon fractions is a process known to a person skilled in the art that makes it possible to obtain a hydrorefining of heavy feedstocks in the presence of a supported catalyst and a soluble catalyst precursor. Document US2005/0241991 describes one or more connected bubbling bed reactors, it being possible for these reactors to operate in hybrid mode with addition of a dispersed organosolubie metal precursor (i.e. in suspension or in slurry) in the feedstock. The addition of the dispersed catalyst, prediluted in vacuum distillate (VGO for Vacuum Gas Oil), can be carried out starting from the first reactor or from the following. It is specified that the catalyst precursor, typically molybdenum 2-ethylhexanoate, forms dispersed molybdenum sulfide by reaction with $H_2S$ resulting from the hydrodesulfurization of the feedstock.

Document US2005/0241992 is equivalent to patent US2005/0241991 but with fixed bed reactors replacing bubbling bed reactors.

Document US2014/0027344 describes a process comprising a first stage of hydrocracking of a feedstock, then a separation of the liquid and volatile fractions and finally a coking stage, the process employing, in the feedstock, a dispersed catalyst resulting from an organosolubie metal salt of the molybdenum 2-ethylhexanoate or molybdenum naphthenate type.

Document WO2012/088025 describes a process for making economic use of heavy feedstocks by using the bubbling bed technology and a two-catalyst system consisting of a supported catalyst and of a dispersed catalyst. The bubbling bed reactor comprises two types of catalysts having different characteristics, including a first catalyst having a size of greater than 0.65 mm and occupying an expanded zone and a second catalyst having a mean size of 1-300 μm and being used in suspension. The second catalyst is introduced into the bubbling bed with the feedstock and passes through the reactor from the bottom upward. The second catalyst is prepared either from unsupported bulk catalysts or by crushing supported catalysts (size of the grains of between 1 and 300 μm).

It is known in particular that certain metal compounds, such as organosolubie compounds (e.g. molybdenum naphthenate; molybdenum octoate) and water-soluble compounds (e.g. phosphomolybdic acid cited in U.S. Pat. Nos. 3,231,488, 4,637,870 and 4,637,871; ammonium heptamolybdate cited in U.S. Pat. No. 6,043,182), can act as dispersed catalyst precursor by thermal decomposition. In the case of water-soluble compounds, the dispersed catalyst precursor is generally mixed with the feedstock via an emulsion. The dissolving of the dispersed catalyst (in general molybdenum) precursor, optionally promoted by cobalt or nickel in acid medium (in the presence of $H_3PO_4$) or basic medium (in the presence of $NH_4OH$), has been the subject of many studies and patents.

Documents WO 2006/031575, WO 2006/031543 and WO 2006/031570 describe the dissolving of a group VIB oxide with an aqueous ammonia solution in order to form a solution which is then sulfided, optionally promoted by the addition of a Group VIB metal after said sulfidation and mixed with the feedstock in the last step.

Patents U.S. Pat. Nos. 4,637,870 and 4,637,871 describe the dissolving of molybdenum by addition of $H_3PO_4$ to phosphomolybdic acid or to $MoO_3$ without promoter and in certain ranges of P/Mo ratio and of molybdenum concentration (<5% by weight).

Patent EP 1 637 576 by the applicant describes a hydroconversion process using a catalyst fraction obtained from a catalyst precursor which is an organometallic compound, a salt or an acid based on molybdenum.

Patent FR 2 913 691 describes the use, for processes for hydroconversion of heavy fractions, of a dispersed catalyst obtained from Anderson structures ($Co^{II}_{3/2}[Co^{III}Mo_6O_{24}H_6]$, $Ni^{II}_{3/2}[Co^{III}Mo_6O_{24}H_6]$, $Co^{II}_3[Co^{II}_2Mo_{10}O_{38}H_4]$, $Ni^{II}_3[Co^{III}_2Mo_{10}O_{38}H_4]$, $Ni^{II}_2[Ni^{II}Mo_6O_{24}H_6]$ and $Ni^{II}_4[Ni^{II}_2Mo_{10}O_{38}H_4]$).

Document US 2008/0177124 describes a process in which an alumina is injected at the same time as or consecutively to the injection of a suspended catalyst precursor (or of the sulfided catalyst itself), the process using a suspended catalyst and a supported catalyst, the supported catalyst being formed within the process by interaction between the dispersed catalyst and the aluminous support.

SUMMARY

Within the context described above, a first subject of the present description is to provide a hydroconversion process having an improved hydrodeasphalting and making possible a reduction in the formation of sediments.

According to a first aspect, the aforementioned subject, and other advantages, are obtained by a process for hydroconversion of a heavy hydrocarbon feedstock in the presence of hydrogen, at least one supported solid catalyst and at least one dispersed solid catalyst, the at least one dispersed solid catalyst being obtained from at least one salt of a heteropolyanion combining molybdenum and at least one metal selected from cobalt and nickel in a Strandberg, Keggin, lacunary Keggin or substituted lacunary Keggin structure. According to one or more embodiments, the at least one heteropolyanion salt satisfies:

the following formula (I) $M_{(6-x)2}H_xP_2Mo_mW_nO_{23}$ in which:
M is the $Ni^{2+}$ cation or the $Co^{2+}$ cation,
H is hydrogen,
x is an integer between 0 and 2,
P is phosphorus,
Mo is molybdenum,
W is tungsten,
m is an integer between 1 and 5, preferably m is an integer between 3 and 5,
n is an integer between 0 and 4, preferably n is an integer between 0 and 2,
m+n=5,
O is oxygen,
the structure $H_xP_2Mo_mW_nO_{23}$ is the negatively charged heteropolyanion, its charge being equal to x−6; or
the following formula (II) $C_pX_{x/2}A_gMo_mW_nX'_zO_yH_h$ in which:
C is the $H^+$ cation and/or a substituted or unsubstituted quaternary ammonium cation (e.g. $N(R_1R_2R_3R_4)^+$ in which $R_1$, $R_2$, $R_3$ and $R_4$ are identical or different, linear, branched, cyclic or cyclic and branched, and correspond to a hydrogen atom or an alkyl group comprising from 1 to 5 carbon atoms), p is an integer between 0 and 6, preferably p is an integer between 0 and 2, such as 0 or 1, X is the $Ni^{2+}$ cation or the $Co^{2+}$ cation, x is an integer between 0 and 11, preferably x is an integer between 3 and 8, p+x is an integer between 3 and 11, preferably p+x is an integer between 3 and 8, A is phosphorus or silicon or boron, preferably A is phosphorus or silicon, g is 0 or 1, preferably g is 1, Mo is molybdenum, W is tungsten, m is an integer between 1 and 12, preferably m is an integer between 9 and 12, n is an integer between 0 and 11, preferably n is an integer between 0 and 3, m+n=9 or 11 or 12, preferably m+n=11 or 12, X' is an element from group VIII of the Periodic Table, preferably X' is nickel or cobalt, z is 0 or 1, x+z is an integer greater than or equal to 1, O is oxygen, y is an integer equal to 34 or 39 or 40, preferably y is an integer equal to 39 or 40, H is hydrogen, h is an integer between 0 and 3, preferably h is an integer between 0 and 2, and the structure $A_gMo_mW_nX'_zO_yH_h$ is the negatively charged heteropolyanion, its charge being equal to −(p+x).

According to one or more embodiments, the at least one heteropolyanion salt satisfies:

the following formula (I) $M_{(6-x)2}H_xP_2Mo_mW_nO_{23}$ in which:

M is the $Ni^{2+}$ cation or the $Co^{2+}$ cation,

H is hydrogen, x is an integer between 0 and 2,

P is phosphorus,

Mo is molybdenum,

W is tungsten, m is an integer between 3 and 5, n is an integer between 0 and 2, m+n=5, O is oxygen, the structure $H_xP_2Mo_mW_nO_{23}$ is the negatively charged heteropolyanion, its charge being equal to x−6; or the following formula (II) $C_pX_{x/2}A_gMo_mW_nX'_zO_yH_h$ in which:

C is the $H^+$ cation and/or a substituted or unsubstituted quaternary ammonium cation (e.g. $N(R_1R_2R_3R_4)^+$ in which $R_1$, $R_2$, $R_3$ and $R_4$ are identical or different, linear, branched, cyclic or cyclic and branched, and correspond to a hydrogen atom or an alkyl group comprising from 1 to 5 carbon atoms), p is an integer between 0 and 2, X is the $Ni^{2+}$ cation or the $Co^{2+}$ cation, x is an integer between 3 and 8, p+x is an integer between 3 and 8, A is phosphorus or silicon, g is 0 or 1, Mo is molybdenum, W is tungsten, m is an integer between 9 and 12, n is an integer between 0 and 3, m+n=11 or 12, X' is nickel or cobalt, z is 0 or 1, O is oxygen, y is an integer equal to 39 or 40, H is hydrogen, h is an integer between 0 and 2, and the structure $A_gMo_mW_nX'_zO_yH_h$ is the negatively charged heteropolyanion, its charge being equal to −(p+according to one or more embodiments, x).

According to one or more embodiments, the at least one heteropolyanion salt is chosen from the following salts: $CO_2H_2P_2Mo_5O_{23}$, $Co_{5/2}HP_2Mo_5O_{23}$, $Co_3P_2Mo_5O_{23}$, $Ni_2H_2P_2Mo_5O_{23}$, $Ni_{5/2}HP_2Mo_5O_{23}$, $Ni_3P_2Mo_5O_{23}$, $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMO_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

According to one or more embodiments, the at least one heteropolyanion salt is chosen from the following salts: $Ni_2H_2P_2Mo_5O_{23}$, $Ni_{5/2}HP_2Mo_5O_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_4SiMo_{11}O_{39}$, $CO_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

According to one or more embodiments, the at least one heteropolyanion salt is chosen from $Ni_2H_2P_2Mo_5O_{23}$, $Ni_{5/2}HP_2Mo_5O_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$ and $Ni_3PMo_{11}NiO_{40}H$.

According to one or more embodiments, the process comprises at least one of the following steps:

a) preparing an aqueous solution comprising the at least one heteropolyanion salt;

b) pre-mixing of the aqueous solution with a hydrocarbon oil in order to form a dilute precursor mixture, c) mixing of the aqueous solution obtained at the end of step a) or of the dilute precursor mixture obtained at the end of step b) with the heavy hydrocarbon feedstock in order to form an active mixture (e.g. an emulsion); and d) implementing the step of hydroconversion of the heavy hydrocarbon feedstock by injecting said aqueous solution obtained at the end of step a), or said dilute precursor mixture obtained at the end of step b), or said active mixture obtained at the end of step c) upstream or directly into a hydroconversion reactor containing the at least one supported solid catalyst.

According to one or more embodiments, the process further comprises the heat treatment, preferably at a temperature of between 200° C. and 500° C., preferably in the presence of a sulfur-containing compound, of the at least one heteropolyanion salt in order to form the at least one dispersed solid catalyst.

According to one or more embodiments, the concentration of the at least one dispersed solid catalyst is between 1 and 5000 ppm by weight of molybdenum relative to the heavy hydrocarbon feedstock at the reactor inlet.

According to one or more embodiments, the hydroconversion step is carried out under an absolute pressure of between 2 and 38 MPa, and/or at a temperature between 300° C. and 500° C. and/or at an hourly space velocity (HSV) of the feedstock relative to the volume of each reactor of between 0.05 and 10 $h^{-1}$ and/or with an amount of hydrogen mixed with the heavy hydrocarbon feedstock of between 50 and 5000 normal cubic meters ($Nm^3$) per cubic meter ($m^3$) of liquid heavy hydrocarbon feedstock.

According to one or more embodiments, the supported solid catalyst comprises a support and an active phase comprising at least one metal from group VIb and at least one metal from group VIII.

According to one or more embodiments, the support is chosen from alumina, silica, silica/alumina, titanium dioxide, carbon, coal and coke, and/or the content of metal from group VIb is between 1% and 30% by weight, expressed as metal oxide, relative to the total weight of the supported solid catalyst, and/or the content of metal from group VIII is between 0.5% and 10% by weight, expressed as metal oxide, relative to the total weight of the supported solid catalyst, and/or the metal from group VIb is chosen from molybdenum, tungsten and the mixture of these two elements, and/or the metal from group VIII is chosen from cobalt, nickel and the mixture of these two elements.

According to one or more embodiments, the heavy hydrocarbon feedstock contains hydrocarbons, of which at least 50% by weight relative to the total weight of the heavy hydrocarbon feedstock have a boiling point of greater than 300° C. and at least 1% by weight have a boiling point of greater than 540° C., sulfur at a content of greater than 0.1% by weight, metals at a content of greater than 20 ppm by weight and C7 asphaltenes at a content of greater than 1% by weight.

According to a second aspect, the aforementioned subject, and other advantages, are obtained by a use of a salt of a heteropolyanion for the hydroconversion of a heavy hydrocarbon feedstock in a reactor containing at least one supported solid catalyst, the heteropolyanion salt combining molybdenum and at least one metal selected from cobalt and nickel in a Strandberg, Keggin, lacunary Keggin or substituted lacunary Keggin structure.

DETAILED DESCRIPTION

The applicant has demonstrated that a dispersed solid catalyst obtained from a precursor, for example obtained in aqueous solution, comprising at least one heteropolyanion salt of Strandberg, Keggin or lacunary Keggin or substituted lacunary Keggin type having in its structure at least molybdenum and at least cobalt and/or at least nickel, has a significantly improved activity in terms of hydrodeasphalting and makes possible a reduction in the formation of sediments, for use in a hybrid reactor, i.e. in a hydroconversion reactor containing at least one supported solid catalyst, such as a supported solid catalyst comprising a support and an active phase comprising at least one metal from group VIb and at least one metal from group VIII and optionally phosphorus.

According to one or more embodiments, the heteropolyanion salt satisfies:
the following formula (I) $M_{(6-x)/2}H_xP_2Mo_mW_nO_{23}$ in which:
M is the $Ni^{2+}$ cation or the $Co^{2+}$ cation,
H is hydrogen,
x is an integer between 0 and 2,
P is phosphorus,
Mo is molybdenum,
W is tungsten,
m is an integer between 1 and 5, preferably m is an integer between 3 and 5,
n is an integer between 0 and 4, preferably n is an integer between 0 and 2,
m+n=5,
O is oxygen,
the structure $H_xP_2Mo_mW_nO_{23}$ is the negatively charged heteropolyanion, its charge being equal to x−6; or
the formula (II) $C_pX_{x/2}A_gMo_mW_nX'_zO_yH_h$ in which:
C is the $H^+$ cation and/or a substituted or unsubstituted quaternary ammonium cation (e.g. $N(R_1R_2R_3R_4)^+$ in which $R_1$, $R_2$, $R_3$ and $R_4$ are identical or different, linear, branched, cyclic or cyclic and branched, and correspond to a hydrogen atom or an alkyl group comprising from 1 to 5 carbon atoms),
p is an integer between 0 and 6, preferably p is an integer between 0 and 2, such as 0 or 1,
X is the $Ni^{2+}$ cation or the $Co^{2+}$ cation,
x is an integer between 0 and 11, preferably x is an integer between 3 and 8,
p+x is an integer between 3 and 11, preferably p+x is an integer between 3 and 8,
A is phosphorus or silicon or boron, preferably A is phosphorus or silicon,
g is 0 or 1, preferably g is 1,
Mo is molybdenum,
W is tungsten,
m is an integer between 1 and 12, preferably m is an integer between 9 and 12,
n is an integer between 0 and 11, preferably n is an integer between 0 and 3, m+n=9 or 11 or 12, preferably m+n=11 or 12,
X' is an element from group VIII of the Periodic Table, preferably X' is nickel or cobalt,
z is 0 or 1,
x+z is an integer greater than or equal to 1
O is oxygen,
y is an integer equal to 34 or 39 or 40, preferably y is an integer equal to 39 or 40,
H is hydrogen,
h is an integer between 0 and 3, preferably h is an integer between 0 and 2, and
the structure $A_gMo_mW_nX'_zO_yH_h$ is the negatively charged heteropolyanion, its charge being equal to −(p+x).

Hereinafter, groups of chemical elements are given according to the CAS classification (CRC Handbook of Chemistry and Physics, CRC Press, Editor in Chief D. R. Lide, 81st edition, 2000-2001). For example, group VIII according to the CAS classification corresponds to the metals from columns 8, 9 and 10 according to the new IUPAC classification; group VIb according to the CAS classification corresponds to the metals from column 6 according to the new IUPAC classification.

The present description also relates to the use of at least one heteropolyanion salt having a Strandberg, Keggin, lacunary Keggin or substituted lacunary Keggin structure combining in its structure at least molybdenum and at least cobalt and/or at least nickel for the preparation of a dispersed solid catalyst for the hydroconversion of heavy hydrocarbon feedstocks in a hybrid reactor.

Strandberg Structures

It is known to a person skilled in the art that the Strandberg heteropolyanions are characterized by their atomic ratio P/(Mo+W) equal to 2/5. These heteropolyanions comprise five $MoO_6$ octahedra forming a ring, these octahedra being connected to one another via an edge, except for two of them which are only connected by a single bridging oxygen atom. The structure is completed by two $PO_4$ octahedra which are each connected to five $MoO_6$ octahedra via three of their oxygen atoms. A heteropolyanion salt having a Strandberg structure has the advantage of combining, in its structure, molybdenum and cobalt and/or nickel ensuring a strong interaction of said cobalt and/or nickel with the molybdenum which makes it possible to achieve high degrees of promotion and to improve the catalytic performance.

Keggin, Lacunary Keggin and Substituted Lacunary Keggin Structures

The isopolyanions, of $M_kO_s^{t-}$ type, may be obtained by condensation of oxoanions of $MO_4^{q-}$ type, where M is a metal atom such as molybdenum or tungsten. The condensation may take place by acidification of the solution with elimination of water molecules and creation of oxo bridges between the metal atoms. Molybdic compounds are well known for this type of reaction, since depending on the pH, a molybdic compound may be in the $MoO_4^{2-}$ monomeric form or condensed in aqueous solution according to the reaction: $7\ MoO_4^{2-}+8\ H^+ \rightarrow Mo_7O_{24}^{6-}+4\ H_2O$. In the presence of an $AO_4^{f-}$ oxoanion, where A is an atom different from M, the metal atoms may join together around this oxoanion and the polycondensation may then result in a mixed species referred to as a heteropolyanion of $A_aM_bO_c^{d-}$ type. For example it is possible to obtain the 12-molybdophosphate (3−) ion, a heteropolyanion of Keggin structure, according to the reaction: $12\ MoO_4^{2-}+HPO_4^{2-}+23H^+ \rightarrow PMo_{12}O_{40}^{3-}+12\ H_2O$. A Keggin heteropolyanion $AM_{12}O_{40}^{d-}$ is formed of a regular $AO_4$ tetrahedron, surrounded by 12 $MO_8$ octahedra which join together by edge-sharing in order to form $M_3O_{13}$ trimetallic groups. A heteropolyanion salt having a Keggin structure has the advantage of combining, in its structure, molybdenum and cobalt and/or nickel ensuring a strong interaction of said cobalt or nickel with the molybdenum, and therefore a high degree of promotion.

It is also possible to obtain a lacunary Keggin structure. It corresponds to the Keggin structure in which one or more sites previously occupied by the metal are rendered vacant. The A/M ratio of these structures is then 11 (or even 9 in certain cases), obtained by removal of one or three metal atoms from a same group or from different $M_3O_{13}$ groups. These lacunary compounds may be synthesized directly from a stoichiometric composition of the reactants in an acid medium, or by partial degradation of the saturated heteropolyanions in an alkaline medium. The site or sites previously occupied by the metal (such as molybdenum and/or tungsten) may be occupied by another element: reference is then made to a substituted lacunary Keggin structure. The lacunary Keggin structure or substituted lacunary Keggin structure (i.e. substituted by nickel and/or cobalt) has the advantage of having a promoter (e.g. nickel and/or cobalt) in a larger amount (higher Co/Mo or Ni/Mo ratio), which favours the sulfidation of the heteropolyanion salt as sheets of $MoS_2$ containing promoters and improves the catalytic activity.

Preparation of the Precursor of the Dispersed Solid Catalyst (Step a)

According to one or more embodiments, the precursor is prepared in aqueous solution (i.e., a solution comprising a sufficient portion of water to enable the dissolution of the compounds used for the preparation of the precursor).

Preparation of a Salt of a Strandberg Heteropolyanion

According to one or more embodiments, the precursor is prepared in aqueous solution (i.e., a solution comprising a sufficient portion of water to enable the dissolution of the compounds used for the preparation of the precursor) by bringing a source of molybdenum, an optional source of tungsten, a source of phosphorus, a source of cobalt and/or a source of nickel into contact.

According to one or more embodiments, said bringing a source of molybdenum, an optional source of tungsten, a source of phosphorus, a source of cobalt and/or a source of nickel into contact is carried out in a few minutes to several hours (e.g. between 2 minutes and 16 hours) at a temperature between 0° C. and 100° C., preferably at reflux, at a temperature between 60° C. and 100° C.

According to one or more embodiments, the source of molybdenum used is chosen from molybdenum oxides, molybdenum hydroxides, molybdic acids and salts thereof, in particular the ammonium or sodium salts such as ammonium molybdate, dimolybdate, heptamolybdate and octamolybdate or sodium molybdate, dimolybdate, heptamolybdate and octamotybdate, phosphomolybdic acids and salts thereof, in particular the ammonium or sodium salts such as ammonium phosphomolybdate or sodium phosphomotybdate.

According to one or more embodiments, the optional source of tungsten is chosen from tungsten oxides, tungsten hydroxides, tungstic acids and salts thereof, in particular the ammonium or sodium salts such as ammonium tungstate or sodium tungstate, phosphotungstic acids and salts thereof.

According to one or more embodiments, the source of cobalt and/or nickel is chosen from cobalt and nickel oxides, hydroxides, hydroxycarbonates, carbonates, acetates, sulfates, phosphates, halides and nitrates, for example nickel hydroxycarbonate, cobalt carbonate or cobalt hydroxide.

According to one or more embodiments, the source of phosphorus is chosen from phosphoric acids and salts thereof, in particular orthophosphoric acid ($H_3PO_4$) or ammonium phosphate, phosphomolybdic acids and salts thereof, in particular the ammonium or sodium salts such as ammonium phosphomolybdate or sodium phosphomolybdate.

According to one or more embodiments, said solution obtained containing said compounds having a Strandberg structure satisfying the formula (I), have an acid pH (i.e., pH below 7), preferentially below 5.5.

According to one or more embodiments, said source of phosphorus and said source of molybdenum and the optional source of tungsten are mixed in aqueous solution in proportions such that the P/Mo molar ratio is between 0.1 and 5, preferably between 0.2 and 1.5, particularly preferably between 0.3 and 0.8, and/or so that the W/Mo molar ratio is between 0 and 25, preferably between 0 and 11, such as between 0 and 5.

According to one or more embodiments, said source of nickel and/or said source of cobalt and said source of molybdenum are mixed in proportions such that the (Co+Ni)/Mo molar ratio is between 0.05 and 5, preferably between 0.1 and 1.5, particularly preferably between 0.2 and 0.7.

According to one or more embodiments, the at least one heteropolyanion salt is chosen from the following salts: $CO_2H_2P_2Mo_5O_{23}$, $Co_{5/2}HP_2Mo_5O_{23}$, $Co_3P_2Mo_5O_{23}$, $Ni_2H_2P_2Mo_5O_{23}$, $Ni_{5/2}HP_2Mo_5O_{23}$, $Ni_3P_2Mo_5O_{23}$.

According to one or more embodiments, the at least one heteropolyanion salt is chosen from the following salts: $Ni_2H_2P_2Mo_5O_{23}$, $N_{5/2}HP_2Mo_5O_{23}$, $Ni_3P_2Mo_5O_{23}$.

Owing to the presence of cobalt and/or nickel and molybdenum in the same Strandberg heteropolyanion salt structure, it is possible to promote the activity of the $MoS_2$ sheets generated after sulfidation. The dispersed solid catalyst thus has a very improved activity compared to the injection of a precursor of molybdenum and of another independent precursor of nickel and/or of cobalt in aqueous solution.

Furthermore, the molybdenum concentration of the solutions thus prepared may range up to values as high as 4 mol of molybdenum per litre of aqueous solution which makes it possible to limit the amount of water to be introduced into the process.

According to one or more embodiments, the Raman spectrum of the at least one heteropolyanion salt comprises at least one main band between 925 and 945 cm$^{-1}$ characteristic of a Strandberg structure. The exact position of the bands, their shapes and their relative intensities may vary to a certain extent as a function of the conditions for recording the spectrum, while remaining characteristic of a Strandberg structure, but also as a function of the chemical nature of the Strandberg heteropolyanion salt and the pH of the solution. The Raman spectra were obtained with a dispersive Raman spectrometer equipped with an ionized argon laser (514 nm). The laser beam is focused on the sample with the aid of a microscope equipped with a ×50 long working distance lens. The power of the laser at the sample is of the order of 1 mW. The Raman signal emitted by the sample is collected by a CCD detector. The spectral resolution obtained is of the order of 1 cm$^1$. The spectral zone recorded is between 100 and 1200 cm$^1$. The acquisition time was set at 60 s for each Raman spectrum recorded.

Preparation of a Salt of a Keggin, Lacunary Keggin or Lacunary Keggin Heteropolyanion According to one or more embodiments, the step a) of preparing the heteropolyanion salt according to the present description comprises at least one of the steps a1), a2), a3) and a4) described below.

a1) preparing an aqueous solution comprising the Keggin structure that satisfies the formula (III) $C_pA_gMo_mW_nO_{40}H_h$ in which:
  C is the H$^+$ cation and/or a substituted or unsubstituted quaternary ammonium cation,
  p is an integer between 0 and 6,
  A is phosphorus or silicon or boron,
  g is 0 or 1,
  Mo is molybdenum,
  W is tungsten,
  m is an integer between 1 and 12,
  n is an integer between 0 and 11,
  m+n=12,
  O is oxygen,
  H is hydrogen,
  h is an integer between 0 and 3.

According to one or more embodiments, the solution obtained during step a1) is prepared by simple dissolving in water of the (commercial) heteropolyacid hydrate or of the (commercial) salts thereof satisfying the formula (IV) $C_pA_gMo_mW_nO_{40}H_h\cdot jH_2O$ in which:
  C is the H$^+$ cation and/or a substituted or unsubstituted quaternary ammonium cation,
  p is an integer between 0 and 6,
  A is phosphorus or silicon or boron,
  g is 0 or 1,
  Mo is molybdenum,
  W is tungsten,
  m is an integer between 1 and 12,
  n is an integer between 0 and 11,
  m+n=12,
  O is oxygen,
  H is hydrogen,
  h is an integer between 0 and 3,
  j is an integer between 0 and 36.

According to one or more embodiments, the compound of formula (IV) used during step a1) is chosen from phosphomolybdic acid ($H_3PMo_{12}O_{40}$) hydrate or silicomolybdic acid ($H_4SiMo_{12}O_{40}$) hydrate or boromolybdic acid ($H_5BMo_{12}O_{40}$) hydrate.

According to one or more embodiments, the preparation of the compound satisfying the formula (III) is carried out by mixing, in aqueous solution, at least one source of molybdenum and optionally a source of tungsten and at least one oxoacid. According to one or more embodiments, the mixing is carried out until an aqueous solution is obtained which is preferably clear, in which aqueous solution the source of molybdenum and the optional source of tungsten are completely dissolved by the action of said oxoacid. According to one or more embodiments, the mixing is carried out with stirring, for example at a temperature between 10° C. and 100° C., such as ambient temperature or between 30° C. and 100° C. (e.g. at reflux), for example for a few minutes to several hours until a clear aqueous solution is obtained. According to one or more embodiments, said solution obtained at the end of step a1) and containing said compounds having a Keggin structure satisfying the formula (III), has an acid pH (i.e., pH below 7), preferentially below 5.5.

According to one or more embodiments, the source of molybdenum used for the implementation of step a1) is chosen from molybdenum oxides, molybdenum hydroxides, molybdic acids and salts thereof, in particular the ammonium or sodium salts such as ammonium molybdate, dimolybdate, heptamolybdate and octamolybdate or sodium molybdate, dimolybdate, heptamolybdate and octamolybdate, phosphomolybdic acids and salts thereof, in particular the ammonium or sodium salts such as ammonium phosphomolybdate or sodium phosphomolybdate, silicomotybdic acids and salts thereof, in particular the ammonium or sodium salts such as ammonium silicomolybdate or sodium silicomolybdate, boromolybdic acids and salts thereof, in particular the ammonium or sodium salts such as ammonium boromolybdate or sodium boromolybdate.

According to one or more embodiments, the optional source of tungsten used for the implementation of step a1) is chosen from tungsten oxides, tungsten hydroxides, tungstic acids and salts thereof, in particular the ammonium or sodium salts such as ammonium tungstate or sodium tungstate, phosphotungstic acids and salts thereof, silicotungstic acids and salts thereof, borotungstic acids and salts thereof.

According to one or more embodiments, the oxoacid compound used for the implementation of said step a1) is chosen from silicic acids (e.g. orthosilicic, metasilicic, pyrosilicic acids), phosphoric acids and boric acids.

According to one or more embodiments and in accordance with said step a1), said oxoacid compound and the source of molybdenum and the optional source of tungsten are mixed in aqueous solution in proportions such that the (oxoacid)/Mo molar ratio is between 1/100 and 50, preferably between 1/50 and 25, such as between 1/20 and 10, and/or so that the W/Mo molar ratio is between 0 and 25, preferably between 0 and 11, such as between 0 and 1.

a2) Partial degradation, in alkaline aqueous solution, of the compound resulting from step a1) satisfying the formula (III), for example by the use of a base having a pKa of greater than or equal to 12, preferably greater than or equal to 14, preferably barium hydroxide Ba(OH)$_2$. Since the introduction of the base makes the solution less acidic, the molybdenum and/or tungsten octahedra of the heteropolymolydic or heteropolytungstic acids obtained at the end of step a1) decondense to form salts satisfying the formula (V) $B_qC_pA_gMo_mW_nO_yH_h$ in which:
- B is barium, calcium, lithium, sodium, potassium, caesium, preferably B is barium,
- q is an integer between 1 and 11,
- C is the $H^+$ cation and/or a substituted or unsubstituted quaternary ammonium cation,
- p is an integer between 0 and 6,
- A is phosphorus or silicon or boron,
- g is 0 or 1,
- Mo is molybdenum,
- W is tungsten,
- m is an integer between 1 and 12,
- n is an integer between 0 and 11,
- m+n=9 or 11 or 12,
- O is oxygen,
- y is an integer equal to 34 or 39 or 40,
- H is hydrogen,
- h is an integer between 0 and 3.

The addition of the base to the aqueous solution obtained at the end of step a1) may be carried out between a few minutes to several hours (e.g. between 2 minutes and 3 hours), for example at a temperature between 0° C. and 100° C., preferably at a temperature between 10° C. and 40° C. In accordance with step a2), the base may be added in proportions such that the (base)/Mo molar ratio is between 1/1000 and 40, preferably between 1/100 and 4, such as between 1/10 and 1.

In accordance with step a2), the base used is preferentially barium hydroxide $Ba(OH)_2$. On the other hand, the base may be a compound other than $Ba(OH)_2$, such as lithium hydroxide LiOH, sodium hydroxide NaOH, potassium hydroxide KOH, caesium hydroxide CsOH, calcium hydroxide $Ca(OH)_2$.

a3) Ion exchange of $Ba^{2+}$ by the promoter cation (for example $Ni^{2+}$ or $Co^{2+}$) in order to produce a heteropolyanion salt according to the present description (i.e., precursor of the dispersed solid catalyst).

Any ion-exchange process known to person skilled in the art may be implemented in step a3), such as for example the use of ion-exchange resins and/or membranes. According to one or more embodiments, step a3) is carried out by addition, to the solution obtained at the end of step a2), of a sulfate, phosphate, carbonate, nitrate, halide such as chloride for example, oxalate, citrate, acetate of promoter metal, preferably sulfate of promoter metal (for example nickel sulfate or cobalt sulfate) which may induce, in addition to the formation of the heteropolyanion salt according to the present description, the precipitation of a salt, for example barium sulfate $BaSO_4$. Step a3) may be carried out in a few minutes to several hours (e.g. between 2 minutes and 3 hours), at a temperature between 0° C. and 100° C., preferably at a temperature between 10° C. and 40° C. In accordance with step a3), a promoter metal of nickel and/or cobalt type is added in proportions such that the (Co+Ni)/Mo molar ratio is between 1/1000 and 50, preferably between 1/100 and 25, such as between 1/25 and 10.

In these examples of step a3), the ion exchange is carried out using barium salts. On the other hand, as a function of the base used in step a2), the ion exchange may be carried out with a cation other than $Ba^{2+}$, such as $Li^+$, $Na^+$, $K^+$, $Cs^+$ or $Ca^{2+}$.

a4) Optional separation of the precipitate capable of being formed during step a3) (e.g. precipitate of $BaSO_4$), from the aqueous solution containing the at least one heteropolyanion salt according to the present description. Any process known to person skilled in the art, such as filtration or centrifugation, can be used to carry out the separation.

In these examples of step a4), the separation is carried out using $BaSO_4$. On the other hand, as a function of the base used in step a2) and of the promoter metal precursor used in step a3), the separation may be carried out with a precipitate other than $BaSO_4$, such as $BaCl_2$, $Ba_3(PO_4)_2$, $Ba(NO_3)_2$, KCl, $KNO_3$, NaCl, $NaNO_3$, $Ca_3(PO_4)_2$, $Ca(NO_3)_2$.

In order to synthesize a heteropolyanion salt according to the present description, it is also possible to use preparations known to a person skilled in the art, such as the preparations described in patents FR 2 749 778, FR 2 764 211 and FR 2 935 139.

Patent FR 2 749 778 describes a process for preparing supported catalysts containing metals from groups VIB and VIII, these metals being introduced in the form of a compound of formula $M_xAB_{12}O_{40}$ in which M is cobalt and/or nickel, A is phosphorus, silicon and/or boron, B is molybdenum and/or tungsten and x takes values of 2 or more, of 2.5 or more, or of 3 or more depending on whether A is phosphorus, silicon or boron respectively. The compound of formula $M_xAB_{12}O_{40}$ may be prepared by treating a heteropolyacid of formula $H_yAB_{12}O_{40}$ (where y is equal to 3, 4 or 5 depending on the nature of A), with a reducing agent, and by adding a compound of cobalt and/or nickel in order to salify the acid functions present.

Patent FR 2 764 211 describes a process for preparing a supported catalyst prepared from a heteropolycompound of formula $M_xAB_{11}O_{40}M'C_{z-2x}.tH_2O$ in which M is cobalt and/or nickel, A is phosphorus, silicon and/or boron, B is molybdenum and/or tungsten and M is cobalt, nickel, iron, copper and/or zinc, x takes a value of between 0 and 4.5, z a value of between 7 and 9, t is an integer varying from 5 to 29 and C is a $H^+$ or alkylammonium cation. The compound is obtained by various ion-exchange steps using a compound of formula $AB_{11}O_{40}M'C_z.tH_2O$. For example, the compound $PCoMo_{11}O_{40}H(NH_4)_6.13H_2O$ is obtained from a reaction medium to which ammonium heptamolybdate, phosphoric acid, sulfuric acid, cobalt sulfate and also ammonium nitrate are respectively added. The compound $PCoMo_{11}O_{40}H(NH_4)_6.13H_2O$ then undergoes a first step of ion exchange with for example tetramethyiammonium chloride (TMA-Cl) in order to form the compound of formula $PCoMo_{11}O_{40}H(TMA)_6.13H_2O$. The latter is then bought into contact with a cobalt perchlorate solution in order to proceed to the last ion exchange and form the desired compound of formula $PCoMo_{11}O_{40}HCo_3$ hydrate.

Patent FR 2 935 139 describes a process for preparing a supported catalyst for hydrocracking of hydrocarbon feedstocks, said supported catalyst being prepared from a heteropolycompound of formula $Ni_{x+y/2}AW_{11-y}O_{39-2.5y}.zH_2O$, in which Ni is nickel, A is phosphorus, silicon and/or boron, W is tungsten, O is oxygen, y is equal to 0 or 2, x is between 3.5 and and 4.5 depending on the nature of A and z is between 0 and 36. Said heteropolycompound is obtained, according to a first step, by reaction between a heteropolyacid of $H_mAW_{12}O_{40}$ type and barium hydroxide ($Ba(OH)_2$), followed by a second step of ion exchange over cation-exchange resins, in order to replace the $Ba^{2+}$ cations with $Ni^{2+}$ cations.

According to one or more embodiments, the at least one heteropolyanion salt according to the present description (e.g. contained in the aqueous solution resulting from step a)) is chosen from the following salts: $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

According to one or more embodiments, the at least one heteropolyanion salt is chosen from the following salts: $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

According to one or more embodiments, the at least one heteropolyanion salt is chosen from $Ni_4SiMo_{11}O_{39}$, $Ni_{7/2}PMo_{11}O_{39}$, $Ni_3SiMo_{11}NiO_{40}H_2$ and $Ni_3PMo_{11}NiO_{40}H$. Since these compounds have high (Co+Ni)/Mo ratios, the Co/Mo and Ni/Mo ratios of the sheets of $MoS_2$ generated after sulfidation make it possible to ensure the promotion of the activity of the molybdenum. The dispersed solid catalyst thus has a very improved activity compared to the injection of a precursor of molybdenum alone or compared to the injection of a precursor of molybdenum simultaneously with the injection of another independent precursor of nickel and/or of cobalt in aqueous solution.

Furthermore, the molybdenum concentration of the solutions thus prepared may range up to values as high as 4 mol of molybdenum per litre of aqueous solution which makes it possible to limit the amount of water to be introduced into the process.

According to one or more embodiments, the Raman spectrum of the at least one heteropolyanion salt comprises at least one main band between 950 and 1010 $cm^{-1}$ characteristic of a Keggin, lacunary Keggin or substituted lacunary Keggin structure. The exact position of the bands, their shapes and their relative intensities may vary to a certain extent as a function of the conditions for recording the spectrum, while remaining characteristic of a Keggin, lacunary Keggin or substituted lacunary Keggin structure, but also as a function of the chemical nature of the Keggin, lacunary Keggin or substituted lacunary Keggin heteropolyanion salt and the pH of the solution. The Raman spectra were obtained with a dispersive Raman spectrometer equipped with an ionized argon laser (514 nm). The laser beam is focused on the sample with the aid of a microscope equipped with a ×50 long working distance lens. The power of the laser at the sample is of the order of 1 mW. The Raman signal emitted by the sample is collected by a CCD detector. The spectral resolution obtained is of the order of 1 $cm^1$. The spectral zone recorded is between 100 and 1200 $cm^1$. The acquisition time was set at 60 s for each Raman spectrum recorded.

Step of Mixing the Aqueous Solution with the Heavy Hydrocarbon Feedstock (Step b)

According to one or more embodiments, the aqueous solution containing the at least one heteropolyanion salt according to the present description is introduced into at least one portion of the heavy hydrocarbon feedstock so as to form a mixture, preferably so as to form an emulsion.

In order to prepare a mixture such as an emulsion according to the mixing step b) of the process according to the present description, the aqueous solution containing the at least one heteropolyanion salt is mixed with the heavy hydrocarbon feedstock, in the presence optionally of at least one surfactant, for example under an absolute pressure of between 0.05 and 20 MPa and/or at a temperature between 0° C. and 200° C. According to one or more embodiments, the emulsion according to the mixing step b) of the process according to the present description is prepared at atmospheric pressure, for example at a temperature below 95° C., preferably below 90° C. and particularly preferably below 85° C. A mixture in which the heteropolyanion salt is dispersed or a "water-in-oil" emulsion may thus be obtained.

According to one or more embodiments, the aqueous solution containing the at least one heteropolyanion salt is pre-mixed with a hydrocarbon oil composed for example of hydrocarbons, of which at least 50% by weight relative to the total weight of the hydrocarbon oil have a boiling point of between 180° C. and 540° C., in order to form a dilute precursor mixture, in the presence optionally at least one surfactant, for example at a temperature below 95° C., preferably below 90° C. and particularly preferably below 85° C. According to one or more embodiments, the amount of hydrocarbon oil corresponds at most to 50% by weight, preferably at most to 30% by weight, particularly preferably at most to 10% by weight (e.g. between 0.1% and 10% by weight) relative to the weight of the heavy hydrocarbon feedstock.

According to one or more embodiments, the aqueous solution or the dilute precursor mixture is mixed, for example sufficiently actively by means of a mixing tool, with the heavy hydrocarbon feedstock by dynamic mixing (e.g. use of a rotor) or static mixing (e.g. use of an injector) in order to obtain an active mixture and preferably an emulsion. In the present application, the term "active mixture" means a mixture in which the heteropolyanion salt is sufficiently dispersed in the feedstock to enable the formation of the dispersed solid catalyst by heat treatment of the mixture. In the present description, the aqueous solution or the dilute precursor mixture is not simply added to the heavy hydrocarbon feedstock.

Any mixing and stirring means known to person skilled in the art may be used to form an active mixture (e.g. emulsion). According to one or more embodiments, the active mixture (e.g. the emulsion) is produced using a colloidal mil or rotor-stator homogenizer such as Ultra-Turrax®, at a stirring speed of between 50 and 24 000 rpm, preferentially at a stirring speed of between 300 and 18 000 rpm, particularly preferably at a stirring speed of between 4000 and 12 000 rpm, for example for a few minutes or even several hours (e.g between 2 minutes and 3 hours).

According to one or more embodiments, the at least one surfactant (i.e., emulsifier, surface-active agent) is an amphiphilic molecule that makes it possible in particular to stabilize an emulsion at the oil phase/aqueous phase interphase. In order to produce an O/W (oil-in-water) emulsion, it is preferable to use a surface-active agent with a hydrophilic tendency. In order to produce a W/O (water-in-oil) emulsion, it is preferable to use a surface-active agent with a lipophilic tendency. The hydrophilic-lipophilic balance (HLB) is thus defined, a criterion proposed by Griffin, W. C., J. Cosmetic Chemists 1949, 1, 131, consisting in attributing to each surface agent a value that illustrates its hydrophilic-lipophilic balance. The HLB varies from 0 to 20. The value 0 corresponds to a completely hydrophobic product and the value 20 corresponds to a completely hydrophilic product. The more polar the oil phase, the more preferable it is to use a hydrophilic surface-active agent; the more non-polar the oil phase, the more preferable it is to use a lipophilic surface-active agent.

According to one or more embodiments, the surfactant used during step b) of the process according to the present description is a surfactant that is nonionic (neither cationic, nor anionic) and/or non-ionizable, and/or that has an HLB of between 0 and 8, such as between 1 and 8, preferably between 2 and 6. According to one or more embodiments, the at least one surfactant is chosen from sorbitan esters such as sorbitan monostearate $C_{24}H_{46}O_8$, sorbitan tristearate $C_{60}H_{114}O_8$, sorbitan monolaurate $C_{18}H_{34}O_6$, sorbitan monooleate $C_{24}H_{44}O_8$, sorbitan monopalmitate $C_{22}H_{42}O_6$, sorbitan trioleate $C_{60}H_{108}O_8$. According to one or more embodiments, the surfactant concentration is at most 20% by weight, such as 10% by weight, relative to the weight of the heavy hydrocarbon feedstock to be treated. According to one or more embodiments, the surfactant concentration is at most 5% by weight (e.g. between 0.1% and 5% by weight) relative to the weight of the heavy hydrocarbon feedstock in order to limit the amounts of surfactant injected into the process.

The mixture of the aqueous solution with the feedstock may then be dried or injected as is directly into the hydroconversion reactor or be injected with (the remainder of) the heavy hydrocarbon feedstock to be treated upstream of the hydroconversion reactor.

According to one or more embodiments, the mixture is pre-dispersed in (the remainder of) the heavy hydrocarbon feedstock with the aid of a solvent. Any hydrocarbon cut such as cuts of naphtha, petroleum, gas oil, vacuum distillate, vacuum residues resulting from a fractionation or from a step of catalytic or thermal conversion or treatment, HCO (Heavy Cycle Oil) or LCO (Light Cycle Oil) catalytic cracking effluents, or any other cut such as DAO (Desasphalted Oil) and aromatic extracts for example, may be suitable as solvent. The solvent used may also belong to the family of aprotic polar solvents such as N-methylpyrrolidone, dimethytformamide, dimethylacetamide, hexamethylphosphoramide, dimethyl sulfoxide, tetrahydrofuran, nitrosodimethylamine and butyrolactone.

Implementation of the Hydroconversion Step (Step c)

In the case of the injection of the mixture (e.g. emulsion) containing the precursor of the dispersed solid catalyst upstream of the reactor, according to one or more embodiments, the mixture is heat treated outside of the reactor at a temperature below or equal to 500° C., preferably at a temperature below or equal to 450° C., preferably between 200° C. and 430° C., preferably in the presence of a source of sulfur, such as $H_2S$ (e.g. $H_2S$ dissolved in the heavy hydrocarbon feedstock), so as to favour the decomposition of the heteropolyanion salt according to the present description in the presence of sulfur, thus generating the active phase, i.e. the dispersed solid catalyst based on molybdenum (and/or tungsten) sulfide promoted by nickel and/or cobalt.

According to one or more embodiments, the decomposition of the at least one heteropolyanion salt to give dispersed solid catalyst is carried out with a total pressure of between 2 MPa and 38 MPa, such as between 5 MPa and 25 MPa. According to one or more embodiments, the decomposition of the at least one heteropolyanion salt to give dispersed solid catalyst is carried out with a partial pressure of $H_2S$ ($ppH_2S$) of between 0 MPa and 16 MPa, such as between 0.01 MPa and 5 MPa, particularly suitable for the formation of the dispersed solid catalyst.

The $H_2S$ may originate for example from the $H_2S$ contained in the hydrogen recycled to the reactor for hydroconversion or for the decomposition of organosulfur molecules present in the feedstock or introduced beforehand (injection of dimethyl disulfide, any sulfur-containing hydrocarbon feedstock of the type of mercaptans, sulfides, sulfur-containing petroleum, sulfur-containing gas oil, sulfur-containing vacuum distillate, sulfur-containing residue) in the heavy hydrocarbon feedstock.

According to one or more embodiments, the mixture containing the precursor of the dispersed solid catalyst is injected into at least one portion of the feedstock containing dissolved hydrogen sulfide (or any other source of sulfur), under temperature and pressure conditions similar to those of the hydroconversion reaction zone (e.g. between 2 and 38 MPa and/or at a temperature between 300° C. and 500° C.), which results in the formation of the dispersed solid catalyst which is then injected into the reactor with the remainder of the heavy hydrocarbon feedstock.

According to one or more embodiments, the mixture containing the precursor of the dispersed solid catalyst is injected into a portion or all of the heavy hydrocarbon feedstock and the precursor of the dispersed solid catalyst is sulfided by means of the dissolved hydrogen sulfide (or any other source of sulfur), before the arrival thereof in the reaction zone.

According to one or more embodiments, the precursor of the dispersed solid catalyst is injected directly into the reactor and is sulfided by reaction with the $H_2S$ resulting from the hydrodesulfurization of the heavy hydrocarbon feedstock in the hydroconversion step.

Once formed, the dispersed solid catalyst circulates with the heavy hydrocarbon feedstock in the reactor, preferably continuously. According to one or more embodiments, the concentration of the dispersed solid catalyst is between 1 and 5000 ppm by weight of molybdenum relative to the heavy hydrocarbon feedstock at the inlet of the reactor, preferably between 2 and 1000 ppm by weight, preferably between 5 and 250 ppm by weight, particularly preferably between 10 and 100 ppm by weight.

According to one or more embodiments, a portion of the effluents converted is recycled upstream of the unit carrying out the hydroconversion process, the recycled effluents containing recycled dispersed solid catalyst.

According to one or more embodiments, the hydroconversion step is a step of hydrocracking the 370° C.+ or 540° C.+ heavy fraction of the heavy hydrocarbon feedstock to give a lighter 370° C.− or 540° C.− ($HDC_{370+}$ or $HDC_{540+}$) fraction. According to one or more embodiments, the hydroconversion step is a step of hydrodemetallization (HDM) and/or of hydrodeasphalting ($HDASC_7$) and/or of hydrodesulfurization (HDS) and/or of hydrodenitrogenation (HDN) and/or of hydroconversion of the Conradson carbon residue (HDCCR).

According to one or more embodiments, the hydroconversion step is carried out by means of one or more three-phase reactors which may be in series and/or in parallel. For example, each hydroconversion reactor may be a reactor of fixed bed, moving bed or bubbling bed type, depending on the heavy hydrocarbon feedstock to be treated. In the hydroconversion step, said heavy hydrocarbon feedstock is generally converted under conventional conditions for hydroconversion of a liquid hydrocarbon fraction. According to one or more embodiments, the hydroconversion step is carried out under an absolute pressure of between 2 and 38 MPa, preferably between 5 and 25 MPa and preferably between 6 and 20 MPa, and/or at a temperature between 300° C. and 500° C. and preferably between 350° C. and 450° C. According to one or more embodiments, the hourly space velocity (HSV) of the feedstock relative to the volume of each reactor is between 0.05 $h^{-1}$ and 10 $h^{-1}$ preferably between 0.10 $h^{-1}$ and 2 $h^{-1}$ and preferably between 0.10 $h^{-1}$ and 1 $h^1$. According to one or more embodiments, the hourly space velocity (HSV) of the feedstock relative to the volume of supported (i.e. non-dispersed) catalyst is between 0.06 $h^{-1}$ and 17 $h^{-1}$ preferably between 0.12 $h^{-1}$ and 3 $h^{-1}$ and preferably between 0.12 $h^{-1}$ and 1.6 $h^1$. According to one or more embodiments, the amount of hydrogen mixed with the heavy hydrocarbon feedstock is preferably between 50 and 5000 normal cubic meters (Nm$^3$) per cubic meter (m$^3$) of liquid heavy hydrocarbon feedstock, such as between 100 and 3000 Nm$^3$/m$^3$ and preferably between 200 and 2000 Nm$^3$/m$^3$.

According to one or more embodiments, the hydroconversion is carried out in one or more three-phase hydroconversion reactors, which can be in series and/or in parallel, using the technology of the boiling bed reactors. According to one or more embodiments, the hydroconversion stage is carried out using the technology and under the conditions of the H-Oil™ process, such as described, for example, in U.S. Pat. No. 4,521,295 or U.S. Pat. No. 4,495,060 or U.S. Pat. No. 4,457,831 or U.S. Pat. No. 4,354,852 or in the paper Aiche, Mar. 19-23, 1995, Houston, Tex., paper number 46d, "Second generation ebullated bed technology". In this implementation, each reactor is operated as a fluidized three-phase bed, also known as bubbling bed. According to one or more embodiments, each reactor comprises a recirculation pump which makes it possible to maintain the supported solid catalyst as a bubbling bed by continuous recycling of at least a part of a liquid fraction drawn off at the top of the reactor and reinjected at the bottom of the reactor.

The Supported Solid Catalyst

The supported (i.e. non-dispersed) solid hydroconversion catalyst used according to the present description can comprise a support (e.g. amorphous support) and an active phase comprising at least one metal from group VIb and at least one metal from group VIII and optionally phosphorus.

According to one or more embodiments, said support is chosen from alumina, silica, silica-alumina, titanium dioxide, carbon, coal and coke. According to one or more embodiments, the support is alumina. According to one or more embodiments, the support satisfies at least one of the following characteristics:
- the loss on ignition measured by calcining at 1000° C. is between around 1% and 15% by weight relative to the weight of the support before treatment at 1000° C.;
- the total pore volume (TPV) is between 0.5 and around 2.0 cm$^3$/g (for example, as measured by mercury porosimetry according to the standard ASTM D4284-92 with a wetting angle of 140°, for example as described in the book by Rouquerol F.; Rouquerol J.; Singh K., "Adsorption by Powders & Porous Solids: Principle, methodology and applications", Academic Press, 1999, for example by means of an Autopore III™ model device from the brand Micromérítics™);
- the specific surface area is between 50 and 350 m$^2$/g (for example, as determined by the B.E.T. method, which method is described in the same book cited above); and
- the pore distribution (for example, as determined by the mercury porosimetry technique), is characterized as follows:
  - % of the total pore volume within the pores having a mean diameter of less than 100 Å: between 0 and 80% by volume relative to the total pore volume of the support,
  - % of the total pore volume within the pores having a mean diameter of between 100 and 1000 Å: between 10% and 90% by volume relative to the total pore volume of the support,
  - % of the total pore volume within the pores having a mean diameter of between 1000 and 5000 Å: between 2% and 60%, preferably between 3% and 35% by volume relative to the total pore volume of the support,
  - % of the total pore volume within the pores having a mean diameter of between 5000 and 10 000 Å: between 0.5% and 50%, preferably between 1% and 30% by volume relative to the total pore volume of the support,
  - % of the total pore volume within the pores having a mean diameter of greater than 10 000 Å: between 0° C. and 20% by volume relative to the total pore volume of the support.

According to one or more embodiments, the percentage of the total pore volume within the pores having a mean diameter of greater than 1000 Å is greater than 10% by volume relative to the total pore volume of the support and the mean diameter of the pores having a diameter of greater than 1000 Å is between 1500 and 8000 Å.

According to one or more embodiments, said support is in the form of beads, of extrudates, of pellets, or of agglomerates which are irregular and non-spherical, the spherical shape of which can result from a crushing stage. According to one or more embodiments, said support is provided in the form of beads or of extrudates.

The supported (i.e. non-dispersed) solid hydroconversion catalyst used according to the present description can contain one or more elements from group VIb and from group VIII, and optionally phosphorus and/or other dopants, such as boron and/or fluorine.

According to one or more embodiments, the content of metal from group VIb is between 1% and 30% by weight, expressed as metal oxide, preferably between 4% and 20% by weight, particularly preferably between 4% and 12% by weight, relative to the total weight of the supported solid catalyst.

According to one or more embodiments, the content of metal from group VIII is between 0.5% and 10% by weight, expressed as metal oxide, preferably between 1% and 6% by weight, particularly preferably between 1% and 4% by weight, relative to the total weight of the supported solid catalyst.

According to one or more embodiments, the metal from group VIb present in the active phase of the supported solid catalyst employed in the hydroconversion process according to the present description is chosen from molybdenum, tungsten and the mixture of these two elements. According to one or more embodiments, the metal from group VIb is molybdenum. According to one or more embodiments, the metal from group VIII present in the active phase of the supported solid catalyst employed in the hydroconversion process according to the present description is chosen from cobalt, nickel and the mixture of these two elements.

According to one or more embodiments, the active phase of the supported solid catalyst is chosen from the group formed by the combination of the elements cobalt/molybdenum, nickel/molybdenum, cobalt/nickel/molybdenum, cobalt/tungsten, nickel/tungsten, cobalt/molybdenum/tungsten or nickel/molybdenum/tungsten. According to one or more embodiments, the active phase of the supported solid catalyst is the combination of the elements cobalt/molybdenum, nickel/molybdenum or cobalt/nickel/molybdenum. According to one or more embodiments, the active phase of the supported solid catalyst is nickel/molybdenum.

According to one or more embodiments, the metal from group VIII to metal from group VIb molar ratio in the supported solid catalyst in the oxide form is between 0.05 and 1, such as between 0.1 and 0.8, and preferably between 0.15 and 0.6.

According to one or more embodiments, the supported solid catalyst comprises a dopant, such as phosphorus. The dopant is an added element which in itself does not exhibit any catalytic nature but which increases the catalytic activity of the active phase. According to one or more embodiments, the phosphorus content in said supported solid catalyst is between 0% and 10% by weight of $P_2O_5$, such as between 0.05% and 8% by weight of $P_2O_5$, preferably between 0.3% and 8% by weight of $P_2O_5$, particularly preferably between 0.5% and 5% by weight of $P_2O_5$, relative to the total weight of the supported solid catalyst.

According to one or more embodiments, the phosphorus to metal from group VIb molar ratio in the supported solid catalyst is zero or greater than or equal to 0.05, such as greater than or equal to 0.07, preferably between 0.08 and 0.5.

According to one or more embodiments, the supported solid catalysts used according to the present description additionally contain at least one dopant chosen from boron and fluorine and a mixture of boron and fluorine.

According to one or more embodiments, when the supported solid catalysts contain boron as dopant, the boron content in said supported catalyst is between 0.1% and 10% by weight of boron oxide, such as between 0.2% and 7% by weight of boron oxide, preferably between 0.2% and 5% by weight of boron oxide, relative to the total weight of the supported solid catalyst.

According to one or more embodiments, when the supported solid catalysts contain fluorine as dopant, the fluorine content in said supported solid catalyst is between 0.1% and 10% by weight of fluorine, such as between 0.2% and 7% by weight of fluorine, preferably between 0.2% and 5% by weight of fluorine, relative to the total weight of the supported solid catalyst. According to one or more embodiments, each reactor of the hydroconversion stage uses a different catalyst suited to the heavy hydrocarbon feedstock which is sent into each reactor. According to one or more embodiments, several types of catalysts can be used in each reactor. According to one or more embodiments, each reactor can contain one or more supported solid catalysts.

The spent supported solid hydroconversion catalyst can, in accordance with the process according to the present description, be at least in part replaced with fresh supported solid catalyst by drawing off, preferably at the bottom of the reactor, and by introduction, either at the top or at the bottom of the reactor, of fresh and/or spent and/or regenerated and/or rejuvenated supported solid catalyst, for example at a regular time interval and preferably spasmodically or virtually continuously. The replacement of supported solid catalyst can be done all or in part with spent and/or regenerated and/or rejuvenated supported solid catalyst resulting from the same reactor and/or from another reactor of any hydroconversion stage. The supported solid catalyst can be added with the metals in the form of metal oxides, with the metals in the form of metal sulfides, or after a preconditioning. According to one or more embodiments, for each reactor, the degree of replacement of the spent supported solid hydroconversion catalyst by fresh supported solid catalyst is between 0.01 kilogram and 10 kilograms per cubic meter of heavy hydrocarbon feedstock treated and preferably between 0.1 kilogram and 3 kilograms per cubic meter of heavy hydrocarbon feedstock treated. According to one or more embodiments, the drawing off and the replacement are carried out using devices which make possible the continuous operation of the hydroconversion stage.

According to one or more embodiments, the spent supported solid catalyst drawn off from the reactor is sent into a regeneration zone in which the carbon and the sulfur which it includes are removed and then of returning the regenerated supported solid catalyst to the hydroconversion stage. According to one or more embodiments, the spent supported solid catalyst drawn off from the reactor is sent into a rejuvenation zone in which the majority of the metals deposited are removed, before sending the spent and rejuvenated supported solid catalyst into a regeneration zone in which the carbon and the sulfur which it includes are removed, then returning the regenerated supported solid catalyst to the hydroconversion stage.

The Heavy Hydrocarbon Feedstock

The heavy hydrocarbon feedstocks capable of being treated by the process according to the present description are hydrocarbon feedstocks that contain hydrocarbons of which at least 50% by weight, preferably at least 65% by weight, particularly preferably at least 80% by weight, relative to the total weight of the heavy hydrocarbon feedstock, have a boiling point of greater than 300° C. and at least 1% by weight have a boiling point of greater than 540° C., sulfur at a content of greater than 0.1% by weight, metals at a content of greater than 20 ppm by weight and C7 asphaltenes at a content of greater than 1% by weight, such as heavy petroleum feedstocks (referred to as residues) and/or hydrocarbon fractions produced in a refinery. The heavy petroleum feedstocks include atmospheric residues, vacuum residues (e.g. atmospheric or vacuum residues resulting from hydrotreating, hydrocracking and/or hydroconversion steps), fresh or refined vacuum distilates, cuts originating from a cracking unit (e.g. a fluid catalytic cracking unit FCC), coking unit or visbreaking unit, aromatic cuts extracted from a unit for producing lubricants, deasphalted oils resulting from a deasphalting unit, asphalts resulting from a deasphalting unit, or a combination of these feedstocks. The heavy hydrocarbon feedstock may further contain a residual fraction resulting from direct coal liquefaction (an atmospheric residue and/or a vacuum residue resulting for example from the H-Coal™ process), a vacuum distillate resulting from direct coal liquefaction, such as for example the H-Coal™ process, or else a residual fraction resulting from the direct liquefaction of lignocellulose biomass alone or as a mixture with coal and/or a fresh and/or refined petroleum fraction.

According to one or more embodiments, the heavy petroleum feedstocks consist of hydrocarbon fractions resulting from a crude oil or from the atmospheric distillation of a crude oil or from the vacuum distillation of crude oil, said feedstocks containing a fraction of at least 50% by weight, relative to the weight of the feedstock, having a boiling point of at least 300° C., preferably at least 350° C. and preferably at least 375° C. and preferably vacuum residues having a boiling point of at least 450° C., preferably at least 500° C. and preferably at least 540° C.

The heavy hydrocarbon feedstocks treated by the process according to the present description may contain impurities, such as metals, sulfur, resins, nitrogen, Conradson carbon residue and heptane insolubles, also referred to as C7 asphaltenes. According to one or more embodiments, the heavy hydrocarbon feedstock comprises a content of metals of greater than 50 ppm by weight, and/or a sulfur content of greater than 0.1% by weight, and/or a content of C7 asphaltenes of greater than 1% by weight, and/or a Conradson carbon content of greater than 3% by weight (e.g. greater than 5% by weight), relative to the total weight of the heavy hydrocarbon feedstock. C7 asphaltenes are compounds known for inhibiting the conversion of residual cuts, both by their ability to form heavy hydrocarbon residues, commonly referred to as coke, and by their tendency to produce sediments that greatly limit the operability of the hydrotreating and hydroconversion units. The Conradson carbon content is defined by the standard ASTM D 482 and represents, the person skilled in the art, a well-known evaluation of the amount of carbon residues produced after a pyrolysis under standard temperature and pressure conditions.

EXAMPLES

Example 1: Preparation of a Solution Containing the Heteropolyanion Salt $Ni_3PMo_{11}NiO_{40}H$ (in Accordance with the Process According to the Present Description)

Solution no. 1 is prepared from 17.0 g of phosphomolybdic acid $H_3PMo_{12}O_{40}.17H_2O$ (0.008 mol) dissolved in 75 cm³ of $H_2O$, at ambient temperature (translucent yellow colour). 5.3 g of $Ba(OH)_2.H_2O$ (0.028 mol) are added to this solution, that is then left stirring for around 30 minutes (no change in colour) before adding 8.4 g of $NiSO_4.6H_2O$ (0.032 mol) thereto. The solution obtained is left stirring for 2 hours (it becomes opaque and greenish) before being filtered through a frit in order to separate the $BaSO_4$ precipitate (white solid) from the solution of $Ni_3PMo_{11}NiO_{40}H$ (pH around 2.5).

The molybdenum concentration is 1.1 mol of Mo per litre of solution.

The Raman spectrum of the solution thus prepared has bands characteristic of the substituted lacunary Keggin heteropolyanion at 975, 887, 600 and 234 $cm^{-1}$.

Example 2: Preparation of a Solution Containing the Heteropolyanion Salt $Ni_4SiMo_{11}O_{39}$ (in Accordance with the Process According to the Present Description)

Solution no. 2 is prepared from 16.4 g of silicomolybdic acid $H_4SiMo_{12}O_{40}.13H_2O$ (0.008 mol) dissolved in 75 cm³ of $H_2O$, at ambient temperature (translucent yellow colour). 6.1 g of $Ba(OH)_2.H_2O$ (0.032 mol) are added to this solution, that is then left stirring for around 30 minutes (no change in colour) before adding 8.4 g of $NiSO_4.6H_2O$ (0.032 mol) thereto. The solution obtained is left stirring for 2 hours (it becomes opaque and greenish) before being filtered through a frit in order to separate the $BaSO_4$ precipitate (white solid) from the solution of $Ni_4SiMo_{11}O_{39}$ (pH of the solution is around 5).

The molybdenum concentration is 1.1 mol of Mo per litre of solution.

The Raman spectrum of the solution thus prepared has bands characteristic of the lacunary Keggin heteropolyanion at 957, 896, 616 and 240 $cm^{-1}$.

Example 3: Preparation of a Solution Containing the Heteropolyanion Salt $Ni_2H_2P_2Mo_5O_{23}$ (in Accordance with the Invention)

Solution no. 3 is prepared by dissolving 13.3 g of molybdenum oxide (purity 99.9%), 3.4 g of nickel hydroxide (purity of 99.5%) and 5.1 g of orthophosphoric acid at 85% in water so as to have a total solution volume of 75 cm³. The Ni/Mo and P/Mo atomic ratios of this solution are respectively 0.40 and 0.48. The pH of the solution is 0.8.

The solution from Example 3 predominantly comprises the nickel salt of the $Ni_2H_2Mo_5O_{23}$ Strandberg heteropolyanions according to the characteristic Raman band at 942 $cm^{-1}$.

Example 4: Emulsifying the Solutions from Examples 1, 2 and 3 (in Accordance with the Process According to the Present Description)

The emulsifying of the solutions 1,2 and 3 is carried out in a heavy organic phase containing asphaltenes which is preheated to 80° C. The heavy hydrocarbon feedstock is a vacuum residue (VR), rich in metals and asphaltenes, the main characteristics of which are reported in Table 1.

TABLE 1

| characteristics of the heavy hydrocarbon feedstock used | |
|---|---|
| Heavy hydrocarbon feedstock | VR |
| Conradson carbon (% by weight) | 21.6 |
| $C_7$ asphaltenes (% by weight) | 12.6 |
| Ni (ppm by weight) | 51 |
| V (ppm by weight) | 165.9 |

The mixing of the hydrocarbon feedstock with the dispersed solid catalyst precursor solution according to the invention is carried out at 80° C., with stirring at 8000 rpm by means of an Ultra-Turrax®, after addition to the oil of the sorbitan monooleate ($C_{24}H_{44}O_6$) surfactant at a concentration of 3% by weight relative to the heavy hydrocarbon feedstock then addition of the aqueous solution containing the precursor.

The molybdenum concentration in the final mixture is 100 ppm by weight relative to the heavy hydrocarbon feedstock.

Example 5: Preparation of a Residue/Molybdenum 2-Ethyhexanoate Solution (not in Accordance with the Process According to the Present Description)

Prior to the incorporation in the heavy organic phase containing asphaltenes, the molybdenum 2-ethylhexanoate is premixed mechanically with a vacuum distillate (VD) while observing the molybdenum 2-ethylhexanoate/VD ratio by weight of 0.75%. Subsequently, the VD/molybdenum 2-ethylhexanoate mixture is added to the heavy hydrocarbon feedstock of the type of residue containing asphaltenes, the main characteristics of which are reported in Table 1, so that the molybdenum concentration in the final mixture is 100 ppm by weight.

It should be noted that the addition of a source of nickel or cobalt does not enhance the performance of the catalyst of Example 5 and that it is not necessary to use a surfactant in order to succeed in dispersing the molybdenum 2-ethylhexanoate in the heavy organic phase.

Example 6: Preparation of a Solid NiMo Catalyst Supported on Alumina

The supported solid catalyst was prepared by dry impregnation of a bimodal alumina with an aqueous solution containing molybdenum and nickel precursors. The impregnation solution was prepared by dissolution, in 80 ml of water, of 6 g of molybdenum oxide and 1.55 g of nickel hydroxide in the presence of 2.3 g of phosphoric acid (purity of 85% in 15% water) at a temperature of 90° C. After the impregnation of the alumina with the solution containing the molybdenum, the nickel and the phosphorus, the supported solid catalyst was dried at 120° C. for 24 hours and then calcined under air at 450° C. for 2 hours in order to form the nickel and 23 molybdenum oxides by decomposition of the corresponding precursors. It is in this oxide form that the supported solid catalyst was charged to the reactor.

Example 7: Comparison of the Performance in Terms of Hydroconversion of Residues The performance in terms of hydroconversion of residues of the dispersed solid catalysts resulting from the emulsions of Example 4 was compared with the performance of the dispersed catalyst resulting from the mixture of Example 5.

The performance of the dispersed solid catalysts was compared in a hybrid reactor, that is to say in a reactor containing the solid catalyst based on nickel and molybdenum supported on alumina from Example 6 plus the dispersed solid catalyst.

The test conditions for carrying out the hydroconversion of the residue in a perfectly stirred continuous reactor are the following:
temperature: 410° C.; total pressure: 16 MPa; HSV: 0.1 h$^{-1}$ (volume flow rate of heavy hydrocarbon feedstock divided by the total volume of reactors); $H_2$/HC at inlet: 1500 Nl/l; concentration of Mo resulting from the dispersed solid catalyst resulting from the preparations desorbed with Examples 4 and 5:100 ppm by weight relative to the feedstock. These conditions make possible the formation of dispersed molybdenum sulfide by reaction with the $H_2S$ resulting from the hydrodesulfurization of the heavy hydrocarbon feedstock with the precursor.

The results obtained are reported in Table 2. Better hydrodeasphalting performance is obtained when the precursor is in accordance with the process according to the present description. In this case, with the use of solutions containing the heteropolyanion salt precursors prepared according to Examples 1, 2 and 3, an increase in the hydrodeasphalting (HDASC$_7$) of the residue from 80% to 86%, 85% or 84% is observed relative to the use of molybdenum 2-ethylhexanoate. In addition, with the use of solutions containing dispersed solid catalyst precursors of heteropolyanion salt type prepared according to Examples 1, 2 and 3, the amount of sediments formed is lower and is decreased by at least a factor of 3 relative to the use of molybdenum 2-ethylhexanoate, which makes it possible to improve the operability of the process.

TABLE 2 performances measured

| Precursor | HDAsC$_7$ (wt %) | Sediments IP375 (wt %) |
|---|---|---|
| NiMo/alumina catalyst from Example 6 + Ni$_3$PMo$_{11}$NiO$_{40}$H from Example 1 (in accordance) | 86 | 0.05 |
| NiMo/alumina catalyst from Example 6 + Ni$_4$SiMo$_{11}$O$_{39}$ from Example 2 (in accordance) | 85 | 0.05 |
| NiMo/alumina catalyst from Example 6 + Ni$_2$H$_2$P$_2$Mo$_5$O$_{23}$ from Example 3 (in accordance) | 84 | 0.05 |
| NiMo/alumina catalyst from Example 6 + molybdenum 2-ethylhexanoate from Example 5 (not in accordance) | 80 | 0.25 |

The invention claimed is:

1. A process for hydroconversion of a heavy hydrocarbon feedstock which comprises introducing the feedstock into a reactor inlet of a reactor and hydroconverting the feedstock in the reactor in the presence of hydrogen, at least one supported solid catalyst and at least one dispersed solid catalyst, wherein the at least one dispersed solid catalyst is obtained from at least one salt of a heteropolyanion combining molybdenum and at least one metal selected from cobalt and nickel in a Strandberg, Keggin, lacunary Keggin or substituted lacunary Keggin structure and the concentration of the at least one dispersed solid catalyst in the reactor is between 1 and 5000 ppm by weight of molybdenum relative to the heavy hydrocarbon feedstock at the reactor inlet.

2. The process as claimed in claim 1, in which the at least one heteropolyanion salt satisfies:
the following formula (I) $M_{(6-x)/2}H_xP_2Mo_mW_nO_{23}$ in which:
M is the Ni$^{2+}$ cation or the Co$^{2+}$ cation,
H is hydrogen,
x is an integer between 0 and 2,
P is phosphorus,
Mo is molybdenum,
W is tungsten,
m is an integer between 1 and 5,
n is an integer between 0 and 4,
m+n=5,
O is oxygen,
the structure $H_xP_2Mo_mW_nO_{23}$ is the negatively charged heteropolyanion, its charge being equal to x−6;
or
the following formula (II) $C_pX_{x/2}A_gMo_mW_nX'_zO_yH_h$ in which:
C is the H$^+$ cation and/or a substituted or unsubstituted quaternary ammonium cation,
p is an integer between 0 and 6,
X is the Ni$^{2+}$ cation or the Co$^{2+}$ cation,
x is an integer between 0 and 11,
p+x is an integer between 3 and 11,
A is phosphorus or silicon or boron,
g is 0 or 1,
Mo is molybdenum,
W is tungsten,
m is an integer between 1 and 12,
n is an integer between 0 and 11,
m+n=9 or 11 or 12,
X is an element from group VIII of the Periodic Table,
z is 0 or 1,
x+z is an integer greater than or equal to 1,
O is oxygen,
y is an integer equal to 34 or 39 or 40,
H is hydrogen,
h is an integer between 0 and 3, and
the structure $A_gMo_mW_nX'_zO_yH_h$ is the negatively charged heteropolyanion, its charge being equal to −(p+x).

3. The process as claimed in claim 1, in which the at least one heteropolyanion salt satisfies:
the following formula (I) $M_{(6-x/2)}H_xP_2Mo_mW_nO_{23}$ in which:
M is the Ni$^{2+}$ cation or the Co$^{2+}$ cation,
H is hydrogen,
x is an integer between 0 and 2,
P is phosphorus,
Mo is molybdenum,
W is tungsten,
m is an integer between 3 and 5,
n is an integer between 0 and 2,
m+n=5,
O is oxygen,
the structure $H_xP_2Mo_mW_nO_{23}$ is the negatively charged heteropolyanion, its charge being equal to x−6;

or the following formula (II) $C_pX_{x/2}A_gMo_mW_nX'_zO_yH_h$ in which:

C is the $H^+$ cation and/or a substituted or unsubstituted quaternary ammonium cation,
p is an integer between 0 and 2,
X is the $Ni^{2+}$ cation or the $Co^{2+}$ cation,
x is an integer between 3 and 8,
p+x is an integer between 3 and 8,
A is phosphorus or silicon,
g is 0 or 1,
Mo is molybdenum,
W is tungsten,
m is an integer between 9 and 12,
n is an integer between 0 and 3,
m+n=11 or 12,
X is nickel or cobalt,
z is 0 or 1,
O is oxygen,
y is an integer equal to 39 or 40,
H is hydrogen,
h is an integer between 0 and 2, and
the structure $A_gMo_mW_nX'_zO_yH_h$ is the negatively charged heteropolyanion, its charge being equal to −(p+x).

4. The process as claimed in claim 1, in which the at least one heteropolyanion salt is chosen from the following salts: $Co_2H_2P_2Mo_5O_{23}$, $Co_{5/2}HP_2Mo_5O_{23}$, $Co_3P_2Mo_5O_{23}$, $Ni_2H_2P_2Mo_5O_{23}$, $Ni_{5/2}HP_2Mo_5O_{23}$, $Ni_3P_2Mo_5O_{23}$, $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CO_{40}H$.

5. The process as claimed in claim 1, in which the at least one heteropolyanion salt is chosen from the following salts: $Ni_2H_2P_2Mo_5O_{23}$, $Ni_{5/2}HP_2MosO_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

6. The process as claimed in claim 1, in which the at least one heteropolyanion salt is chosen from $Ni_2H_2P_2MosO_{23}$, $Ni_{5/2}HP_2Mo_5O_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$ and $Ni_3PMo_{11}NiO_{40}H$.

7. The process as claimed in claim 1, further comprising the following step a) and at least one of the following steps b), c) and/or d):

a) preparing an aqueous solution comprising the at least one heteropolyanion salt;
b) pre-mixing of the aqueous solution with a hydrocarbon oil in order to form a dilute precursor mixture,
c) mixing of the aqueous solution obtained at the end of step a) or of the dilute precursor mixture obtained at the end of step b) with the heavy hydrocarbon feedstock in order to form an active mixture; and
d) implementing the step of hydroconversion of the heavy hydrocarbon feedstock by injecting said aqueous solution obtained at the end of step a), or said dilute precursor mixture obtained at the end of step b), or said active mixture obtained at the end of step c) upstream or directly into a hydroconversion reactor containing the at least one supported solid catalyst.

8. The process as claimed in claim 1, further comprising heat treating the at least one heteropolyanion salt in order to form the at least one dispersed solid catalyst.

9. The process as claimed in claim 8, in which the heat treatment is carried out in the presence of at least one sulfur-containing compound.

10. The process as claimed in claim 1, in which the hydroconversion step is carried out under an absolute pressure of between 2 and 38 MPa, and/or at a temperature between 300° C. and 500° C. and/or at an hourly space velocity (HSV) of the feedstock relative to the total reactor volume of between 0.05 and 10 $h^{-1}$ and/or with an amount of hydrogen mixed with the heavy hydrocarbon feedstock of between 50 and 5000 normal cubic meters ($Nm^3$) per cubic meter ($m^3$) of liquid heavy hydrocarbon feedstock.

11. The process as claimed in claim 1, in which the supported solid catalyst comprises a support and an active phase comprising at least one metal from group VIb and at least one metal from group VIII.

12. The process as claimed in claim 11, in which the support is chosen from alumina, silica, silica/alumina, titanium dioxide, carbon, coal and coke, and/or the content of metal from group VIb is between 1% and 30% by weight, expressed as metal oxide, relative to the total weight of the supported solid catalyst, and/or the content of metal from group VIII is between 0.5% and 10% by weight, expressed as metal oxide, relative to the total weight of the supported solid catalyst, and/or the metal from group VIb is chosen from molybdenum, tungsten and the mixture of these two elements, and/or the metal from group VIII is chosen from cobalt, nickel and the mixture of these two elements.

13. The process as claimed in claim 1, in which the heavy hydrocarbon feedstock contains hydrocarbons, of which at least 50% by weight have a boiling point of greater than 300° C. and at least 1% by weight have a boiling point of greater than 540° C., sulfur at a content of greater than 0.1% by weight, metals at a content of greater than 20 ppm by weight and C7 asphaltenes at a content of greater than 1% by weight, relative to the total weight of the heavy hydrocarbon feedstock.

14. The process as claimed in claim 1, in which the supported solid catalyst comprises a support and an active phase comprising at least one metal from group VIb and at least one metal from group VIII.

15. The process as claimed in claim 14, in which the support is chosen from alumina, silica, silica/alumina, titanium dioxide, carbon, coal and coke, and/or the content of metal from group VIb is between 1% and 30% by weight, expressed as metal oxide, relative to the total weight of the supported solid catalyst, and/or the content of metal from group VIII is between 0.5% and 10% by weight, expressed as metal oxide, relative to the total weight of the supported solid catalyst, and/or the metal from group VIb is chosen from molybdenum, tungsten and the mixture of these two elements, and/or the metal from group VIII is chosen from cobalt, nickel and the mixture of these two elements.

16. A process for hydroconversion of a heavy hydrocarbon feedstock which comprises introducing the feedstock into a reactor inlet of a reactor and hydroconverting the feedstock in the reactor in the presence of hydrogen, at least one supported solid catalyst and at least one dispersed solid catalyst, wherein the at least one dispersed solid catalyst is obtained from at least one salt of a heteropolyanion combining molybdenum and at least one metal selected from cobalt and nickel in a Strandberg, Keggin, lacunary Keggin or substituted lacunary Keggin structure; and further comprising the following step a) and at least one of the following steps b), c) and/or d):
a) preparing an aqueous solution comprising the at least one heteropolyanion salt;
b) pre-mixing of the aqueous solution with a hydrocarbon oil in order to form a dilute precursor mixture,
c) mixing of the aqueous solution obtained at the end of step a) or of the dilute precursor mixture obtained at the end of step b) with the heavy hydrocarbon feedstock in order to form an active mixture; and
d) implementing the step of hydroconversion of the heavy hydrocarbon feedstock by injecting said aqueous solution obtained at the end of step a), or said dilute precursor mixture obtained at the end of step b), or said active mixture obtained at the end of step c) upstream or directly into a hydroconversion reactor containing the at least one supported solid catalyst.

17. The process as claimed in claim 16, in which the at least one heteropolyanion salt satisfies:
the following formula (I) $M_{(6-x)/2}H_xP_2Mo_mW_nO_{23}$ in which:
M is the $Ni^{2+}$ cation or the $Co^{2+}$ cation,
H is hydrogen,
x is an integer between 0 and 2,
P is phosphorus,
Mo is molybdenum,
W is tungsten,
m is an integer between 1 and 5,
n is an integer between 0 and 4,
m+n=5,
O is oxygen,
the structure $H_xP_2Mo_mW_nO_{23}$ is the negatively charged heteropolyanion, its charge being equal to x−6;
or
the following formula (II) $C_pX_{x/2}A_gMo_mW_nX'_zO_yH_h$ in which:
C is the $H^+$ cation and/or a substituted or unsubstituted quaternary ammonium cation,
p is an integer between 0 and 6,
X is the $Ni^{2+}$ cation or the $Co^{2+}$ cation,
x is an integer between 0 and 11,
p+x is an integer between 3 and 11,
A is phosphorus or silicon or boron,
g is 0 or 1,
Mo is molybdenum,
W is tungsten,
m is an integer between 1 and 12,
n is an integer between 0 and 11,
m+n=9 or 11 or 12,
X is an element from group VIII of the Periodic Table,
z is 0 or 1,
x+z is an integer greater than or equal to 1,
O is oxygen,
y is an integer equal to 34 or 39 or 40,
H is hydrogen,
h is an integer between 0 and 3, and
the structure $A_gMo_mW_nX'_zO_yH_h$ is the negatively charged heteropolyanion, its charge being equal to −(p+x).

18. The process as claimed in claim 16, in which the at least one heteropolyanion salt satisfies:
the following formula (I) $M_{(6-x)/2}H_xP_2Mo_mW_nO_{23}$ in which:
M is the $Ni^{2+}$ cation or the $Co^{2+}$ cation,
H is hydrogen,
x is an integer between 0 and 2,
P is phosphorus,
Mo is molybdenum,
W is tungsten,
m is an integer between 3 and 5,
n is an integer between 0 and 2,
m+n=5,
O is oxygen,
the structure $H_xP_2Mo_mW_nO_{23}$ is the negatively charged heteropolyanion, its charge being equal to x−6;
or
the following formula (II) $C_pX_{x/2}A_gMo_mW_nX'_zO_yH_h$ in which:
C is the $H^+$ cation and/or a substituted or unsubstituted quaternary ammonium cation,
p is an integer between 0 and 2,
X is the $Ni^{2+}$ cation or the $Co^{2+}$ cation,
x is an integer between 3 and 8,
p+x is an integer between 3 and 8,
A is phosphorus or silicon,
g is 0 or 1,
Mo is molybdenum,
W is tungsten,
m is an integer between 9 and 12,
n is an integer between 0 and 3,
m+n=11 or 12,
X' is nickel or cobalt,
z is 0 or 1,
O is oxygen,
y is an integer equal to 39 or 40,
H is hydrogen,
h is an integer between 0 and 2, and
the structure $A_gMo_mW_nX'_zO_yH_h$ is the negatively charged heteropolyanion, its charge being equal to −(p+x).

19. The process as claimed in claim 16, in which the at least one heteropolyanion salt is chosen from the following salts: $Co_2H_2P_2MoSO_{23}$, $Co_{5/2}HP_2Mo_5O_{23}$, $CO_3P_2Mo_5O_{53}$, $Ni_2H_2P_2Mo_5O_{23}$, $Ni_{5/2}HP_2Mo_5O_{23}$, $Ni_3P_2Mo_5O_{23}$, $Ni_{3/2}PMo_{12}O_{40}$, $Ni_2SiMo_{12}O_{40}$, $Ni_3Mo_{12}O_{40}H_2$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_{3/2}PMo_{12}O_{40}$, $Co_2SiMo_{12}O_{40}$, $Co_3Mo_{12}O_{40}H_2$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

20. The process as claimed in claim 16, in which the at least one heteropolyanion salt is chosen from the following salts: $Ni_2H_2P_2Mo_5O_{23}$, $Ni_{5/2}HP_2Mo_5O_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$, $Ni_3PMo_{11}NiO_{40}H$, $Co_4SiMo_{11}O_{39}$, $Co_{7/2}PMo_{11}O_{39}$, $Co_3SiMo_{11}CoO_{40}H_2$, $Co_3SiMo_{11}NiO_{40}H_2$, $Ni_3SiMo_{11}CoO_{40}H_2$, $Co_3PMo_{11}CoO_{40}H$, $Co_3PMo_{11}NiO_{40}H$ and $Ni_3PMo_{11}CoO_{40}H$.

21. The process as claimed in claim 16, in which the at least one heteropolyanion salt is chosen from $Ni_2H_2P_2Mo_5O_{23}$, $Ni_{5/2}HP_2Mo_5O_{23}$, $Ni_3P_2Mo_5O_{23}$, $Ni_4SiMo_{11}O_{39}$, $Ni_{7/2}PMo_{11}O_{39}$, $Ni_3SiMo_{11}NiO_{40}H_2$ and $Ni_3PMo_{11}NiO_{40}H$.

22. The process as claimed in claim 16, further comprising heat treating the at least one heteropolyanion salt in order to form the at least one dispersed solid catalyst.

23. The process as claimed in claim 22, in which the heat treatment is carried out in the presence of at least one sulfur-containing compound.

24. The process as claimed in claim 16, in which the concentration of the at least one dispersed solid catalyst is between 1 and 5000 ppm by weight of molybdenum relative to the heavy hydrocarbon feedstock at the reactor inlet.

25. The process as claimed in claim 16, in which the hydroconversion step is carried out under an absolute pressure of between 2 and 38 MPa, and/or at a temperature between 300° C. and 500° C. and/or at an hourly space velocity (HSV) of the feedstock relative to the total reactor volume of between 0.05 and 10 $h^{-1}$ and/or with an amount of hydrogen mixed with the heavy hydrocarbon feedstock of between 50 and 5000 normal cubic meters ($Nm^3$) per cubic meter ($m^3$) of liquid heavy hydrocarbon feedstock.

26. The process as claimed in claim 16, in which the heavy hydrocarbon feedstock contains hydrocarbons, of which at least 50% by weight have a boiling point of greater than 300° C. and at least 1% by weight have a boiling point of greater than 540° C., sulfur at a content of greater than 0.1% by weight, metals at a content of greater than 20 ppm by weight and C7 asphaltenes at a content of greater than 1% by weight, relative to the total weight of the heavy hydrocarbon feedstock.

\* \* \* \* \*